United States Patent
Ueda et al.

(10) Patent No.: US 10,903,461 B2
(45) Date of Patent: *Jan. 26, 2021

(54) BATTERY ARMORING STAINLESS STEEL FOIL, AND METHOD OF PRODUCING SAME

(71) Applicant: Nisshin Steel Co., Ltd., Tokyo (JP)

(72) Inventors: Daichi Ueda, Tokyo (JP); Shoichi Matsuo, Tokyo (JP); Takahiro Fujii, Tokyo (JP); Naoki Hirakawa, Tokyo (JP); Shuichi Sugita, Tokyo (JP); Yukio Oda, Tokyo (JP)

(73) Assignee: Nisshin Steel Co., Ltd., Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 15/577,629

(22) PCT Filed: May 20, 2016

(86) PCT No.: PCT/JP2016/065056
§ 371 (c)(1),
(2) Date: Nov. 28, 2017

(87) PCT Pub. No.: WO2016/194660
PCT Pub. Date: Dec. 8, 2016

(65) Prior Publication Data
US 2018/0166661 A1  Jun. 14, 2018

(30) Foreign Application Priority Data
May 29, 2015 (JP) .................. 2015-110227

(51) Int. Cl.
*H01M 2/02* (2006.01)
*C21D 1/76* (2006.01)
(Continued)

(52) U.S. Cl.
CPC ............ *H01M 2/0257* (2013.01); *C21D 1/76* (2013.01); *C21D 6/004* (2013.01); *C21D 9/46* (2013.01);
(Continued)

(58) Field of Classification Search
None
See application file for complete search history.

(56) References Cited

U.S. PATENT DOCUMENTS

| | | | |
|---|---|---|---|
| 2007/0065717 A1 | 3/2007 | Morikawa et al. | |
| 2011/0076505 A1 | 3/2011 | Ishii et al. | |
| 2016/0079455 A1* | 3/2016 | Hatano | H01L 31/03923 136/252 |

FOREIGN PATENT DOCUMENTS

| | | | |
|---|---|---|---|
| JP | 07026395 A | * | 1/1995 |
| JP | 10-208708 A | | 8/1998 |

(Continued)

OTHER PUBLICATIONS

Amaya et al., JP-07026395-A, Abstract).*
(Continued)

*Primary Examiner* — Haixia Zhang
(74) *Attorney, Agent, or Firm* — Mintz Levin Cohn Ferris Glovsky and Popeo, P.C.; David G. Conlin; Joohee Lee

(57) ABSTRACT

Provided is a battery armoring stainless steel foil which, without the need for a special treatment such as corona discharge, has excellent adhesiveness to resin after being thermally shocked and after being immersed in an electrolyte solution. A battery armoring stainless steel foil (1) includes an oxide film (1a), having a thickness of not less than 2 nm, which contains (i) one or more metallic elements, existing as a hydroxide, in an amount of not less than 35 mol percent and (ii) $SiO_2$ in an amount of not more than 40 mol percent, the battery armoring stainless steel foil (1) having an arithmetic mean roughness Ra of less than 0.1 μm but not (Continued)

less than 0.02 μm in a direction orthogonal to a direction in which the battery armoring stainless steel foil (1) has been rolled.

5 Claims, 2 Drawing Sheets

(51) Int. Cl.
*C21D 6/00* (2006.01)
*C21D 9/46* (2006.01)
*C22C 38/00* (2006.01)
*C22C 38/02* (2006.01)
*C22C 38/04* (2006.01)
*C22C 38/40* (2006.01)
*C23C 8/18* (2006.01)
*C23F 17/00* (2006.01)

(52) U.S. Cl.
CPC ............ *C22C 38/002* (2013.01); *C22C 38/02* (2013.01); *C22C 38/04* (2013.01); *C22C 38/40* (2013.01); *C23C 8/18* (2013.01); *C23F 17/00* (2013.01); *H01M 2/02* (2013.01); *H01M 2/0202* (2013.01)

(56) References Cited

FOREIGN PATENT DOCUMENTS

| JP | 2900755 | 6/1999 |
|---|---|---|
| JP | 2001-234296 A | 8/2001 |
| JP | 2004-052100 A | 2/2004 |
| JP | 2005-001245 A | 1/2005 |
| JP | 2009-167486 A | 7/2009 |
| JP | 2011-046981 A | 3/2011 |
| JP | 2011-102423 A | 5/2011 |
| JP | 2012-033295 A | 2/2012 |
| JP | 2012-092361 A | 5/2012 |
| JP | 2013-014796 A | 1/2013 |
| TW | 201211267 A | 3/2012 |
| TW | 201315844 A | 4/2013 |

OTHER PUBLICATIONS

Amaya et al., JP-07026395-A, machine translation).*
International Preliminary Report on Patentability and Written Opinion of the Internationl Searching Authority dated Dec. 5, 2017 in corresponding PCT/JP2016/065056.
International Preliminary Report on Patentability and Written Opinion of the Internationl Searching Authority dated Dec. 5, 2017 in corresponding PCT/JP2016/065057.
Notification of Reasons for Refusal for JP 2015-110227 (dated Jul. 26, 2016).
International Search Report for PCT/JP2016/065056 (date Aug. 2, 2016).
Notification of Reasons for Refusal for JP 2015-110228 (dated Jul. 26, 2016).
International Search Report for PCT/JP2016/065057 (dated Aug. 2, 2016).
Office Action dated Oct. 18, 2018 in corresponding Chinese Application No. 201680030720.X.
European Search Report dated Sep. 13, 2018 in corresponding European Patent Application No. 16803095.5.
Office Action for Taiwan Application No. 105116030, dated May 30, 2019, English translation (6 pages).

* cited by examiner

BATTERY ARMORING STAINLESS STEEL FOIL, AND METHOD OF PRODUCING SAME

TECHNICAL FIELD

The present invention relates to a stainless steel foil for battery armoring, which stainless steel foil (hereinafter referred to as a "battery armoring stainless steel foil") is suitable for a container of a lithium ion secondary battery and the like.

BACKGROUND ART

Secondary batteries such as nickel cadmium batteries, nickel hydrogen batteries, and lithium ion secondary batteries are used in electric devices and electronic devices such as mobile phones and laptop computers. Lithium ion secondary batteries in particular are often used in mobile phones and other mobile devices due to their high weight energy density and suitability for small and lightweight applications. In recent times, lithium ion secondary batteries have been used in an increasingly wide range of fields, as seen in their use in power tools, electric vehicles, hybrid cars, and small satellites.

In these fields, there has been a demand for reductions in size, weight, and cost as well as for improvements in weight energy density and safety. A material used for armoring of a battery such as a lithium ion secondary battery is typically a metal foil which has been coated with resin in a laminated manner on one or both sides thereof. Such a material is heat sealed so as to produce a battery container. Along with the above-described increasing demands, there has also been a need for a battery container to be shaped so as to allow battery components to efficiently fill the battery container without dead space. As such, there is a demand for metal foil as a battery armoring material, since metal foil exhibits superior processability in press working such as bulging. Aluminum foil and aluminum alloy foil are often used due to the ease which they can be made thin and press worked. For example, Patent Literature 1 discloses a battery armoring material which is obtained by coating an aluminum alloy foil with polypropylene (PP) in a laminated manner, the foil containing Fe in an amount of not less than 0.6%. Patent Literature 1 discloses that the material is useful for size and weight reduction.

Unfortunately, further reductions in the thickness of aluminum foil will reduce its breaking strength and therefore make the material more likely to break during press working. There is also the risk that an external force such as a vibration, an impact, or a piercing force acting on the battery armoring material may cause the material to become deformed or damaged and that electrolyte solution will leak out from the battery as a result.

Furthermore, lithium ion secondary batteries currently use an electrolyte solution obtained by dissolving $LiPF_6$ into a mixed solution containing ethylene carbonate and dialkyl carbonic ester. Such an electrolyte solution is known to react with water to produce hydrogen fluoride. Because hydrogen fluoride is highly corrosive, a leak of electrolyte solution is likely to significantly damage a device to which a lithium ion battery is mounted. As such, from the standpoint of safety, there is a demand for a metal foil having a high breaking strength for use as a battery armoring material.

There have therefore been recent developments in techniques involving stainless steel foil as a battery armoring material which can fulfill the above-described property requirements. Stainless steel foil has high strength and is typically several times stronger than aluminum foil in terms of tensile strength and the like. Compared to conventional materials for a battery armoring, stainless steel foil can be made to be thinner and is safer.

An important parameter of a battery armoring material is adhesiveness between the metal foil and the resin coated thereon in a laminated manner on a side that comes in contact with electrolyte solution. In a case where there is poor adhesiveness between the resin and the metal foil, electrolyte solution which permeates into the resin over time will cause the resin to peel from the metal foil once the electrolyte solution reaches the surface of the metal foil. This creates the risk of the electrolyte solution leaking. Patent Literatures 2 and 3 disclose methods of improving the adhesiveness of the stainless steel foil itself with respect to resin. These methods involve subjecting the stainless steel foil to heat treatment in a reducing atmosphere so as to provide, to the stainless steel foil, an oxide film having superior adhesiveness.

Patent Literature 2 discloses subjecting a stainless steel sheet, having a random abrasion pattern or a hairline abrasion pattern, to bright annealing at a temperature of not less than 800° C. so as to provide an oxide film in which Si content is increased to not less than 50 mol percent. This improves adhesiveness between the stainless steel and resin such as epoxy-based and polyester-based resin.

Patent Literature 3 discloses annealing a stainless steel foil which has been given an arithmetic mean roughness Ra of not less than 0.1 μm by use of hairline abrasion or a reduction roll having a rough surface. The stainless steel foil is annealed at a temperature in a range of 600° C. to 800° C. so as to obtain an oxide film in which (i) oxygen content is within a range of 20 mol percent to 60 mol percent and (ii) Cr content is higher than Fe content. This improves adhesiveness between the stainless steel foil and polyolefin-based resin.

Patent Literature 4 discloses bringing a surface of a stainless steel sheet into contact with water vapor plasma generated by corona discharge in atmospheric pressure. This renders the surface of the stainless steel sheet rich in metal hydroxide (hydroxy group: —OH) and therefore improves adhesiveness of an applied film. The techniques of Patent Literature 4 make use of a dehydration condensation reaction and hydrogen bonds between (i) hydroxides in the surface of the stainless steel sheet and (ii) a hydroxy group, carboxy group (—COOH) and the like in the applied film.

CITATION LIST

Patent Literature

[Patent Literature 1]
Japanese Patent Application Publication, Tokukaihei, No. 10-208708 (Publication Date: Aug. 7, 1998)
[Patent Literature 2]
Japanese Patent Application Publication, Tokukai, No. 2005-001245 (Publication Date: Jan. 6, 2005)
[Patent Literature 3]
Japanese Patent Application Publication, Tokukai, No. 2012-033295 (Publication Date: Feb. 16, 2012)
[Patent Literature 4]
Japanese Patent Application Publication, Tokukai, No. 2011-046981 (Publication Date: Mar. 10, 2011)

SUMMARY OF INVENTION

Technical Problem

In a case where the techniques of Patent Literature 2 are applied to a stainless steel foil serving as a battery armoring material, the oxide film will have a high Si content. As such, after the battery armoring material is immersed in electrolyte solution, an Si—O bond will be more likely to be split by hydrogen fluoride produced by a reaction between the electrolyte solution and water. As a result, adhesiveness between the stainless steel foil and the resin will unfortunately decrease.

The techniques of Patent Literature 3 improve adhesiveness between the stainless steel foil and the resin by (i) annealing being carried out at a temperature in a range of 600° C. to 800° C. so as to prevent an increase of Si content in the oxide film and (ii) the arithmetic mean roughness Ra of the stainless steel foil being not less than 0.1 μm. With such an arithmetic mean roughness Ra, work hardening causes changes in the diffusion coefficient of atoms such that Cr content becomes higher than Fe content in the oxide film. It is, however, desirable to improve the adhesiveness even further. A secondary battery undergoes a temperature rise during charging and is therefore repeatedly subjected to thermal shocks (changes in temperature). It is desirable to improve adhesiveness between stainless steel foil and resin as observed after such thermal shocks. It is also desirable to further improve adhesiveness between stainless steel foil and resin as observed after immersion into electrolyte solution.

The techniques of Patent Literature 4 require a special treatment such as corona discharge and therefore unfortunately complicate the production process.

The present invention has been accomplished in view of the above problems. It is an object of the present invention to provide a battery armoring stainless steel foil which, without the need for a special treatment such as corona discharge, has excellent adhesiveness to resin after being thermally shocked and after being immersed in an electrolyte solution.

Solution to Problem

The inventors of the present invention achieved the present invention after discovering, through diligent study, that excellent adhesiveness between a battery armoring stainless steel foil and resin can be obtained by (i) adjusting annealing conditions so as to adjust a content rate of metallic elements existing as a hydroxide in an oxide film, (ii) setting a lower limit for a thickness of the oxide film, and (iii) adjusting an arithmetic mean roughness of the oxide film.

A battery armoring stainless steel foil in accordance with an aspect of the present invention includes an oxide film, having a thickness of not less than 2 nm, which contains (i) one or more metallic elements, existing as a hydroxide, in an amount of not less than 35 mol percent and (ii) $SiO_2$ in an amount of not more than 40 mol percent, the battery armoring stainless steel foil having an arithmetic mean roughness Ra of less than 0.1 μm but not less than 0.02 μm in a direction orthogonal to a direction in which the battery armoring stainless steel foil has been rolled.

Advantageous Effects of Invention

With an aspect of the present invention, a content rate of metallic elements existing as a hydroxide in the oxide film is high, at not less than 35 mol percent. This improves adhesiveness to resin. The content rate of $SiO_2$ in the oxide film is set as being not more than 40 mol percent, which makes it possible to improve adhesiveness to resin as observed after immersion in electrolyte solution. The thickness of the oxide film is set as being not less than 2 nm, which makes it possible to achieve an adequate effect of increasing the adhesiveness to resin. The arithmetic mean roughness Ra of the battery armoring stainless steel foil having the oxide film is set as being less than 0.1 μm but not less than 0.02 μm in the direction orthogonal to the direction in which the battery armoring stainless steel foil has been rolled. This makes it possible to prevent a decrease in adhesiveness to resin, as observed after thermal shock or after immersion in electrolyte solution, which decrease stems from air which has been entrained between the battery armoring stainless steel foil and the resin. The above configuration therefore makes it possible to provide a battery armoring stainless steel foil which, without the need for a special treatment such as corona discharge, has excellent adhesiveness to resin after being thermally shocked and after being immersed in an electrolyte solution.

DESCRIPTION OF EMBODIMENTS

The following description will discuss a battery armoring stainless steel foil, in accordance with Embodiment 1 of the present invention, which has excellent adhesiveness to resin after being thermally shocked and after being immersed in an electrolyte solution. Note that the following descriptions are provided in order to better explain the gist of the present invention and are therefore not limiting unless otherwise specified. Note also that "A to B" as used herein means "not less than A and not more than B."

Figure 1:
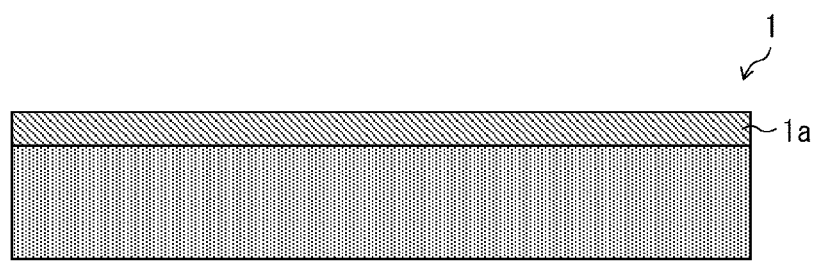
FIG. 1 is a cross-sectional view of a battery armoring stainless steel foil in accordance with an embodiment of the present invention.

FIG. 1 is a cross-sectional view of a battery armoring stainless steel foil in accordance with Embodiment 1. As illustrated in FIG. 1, an oxide film 1a is formed on a surface of a battery armoring stainless steel foil 1. The battery armoring stainless steel foil 1 is produced by a method which includes the steps of: (i) preparing a stainless steel foil having a predetermined thickness by rolling a stainless steel sheet with the use of reduction rolls and (ii) annealing the stainless steel foil thus prepared. As appropriate, such a method can further include, after the step (ii), the step of (iii) subjecting the surface of the battery armoring stainless steel foil 1 to abrasion so that the surface has a desired roughness. A surface of the oxide film 1a of the battery armoring stainless steel foil 1 thus prepared is coated with a resin (not shown) in a laminated manner, and the battery armoring stainless steel foil 1 is then processed into a shape of a battery container.

The stainless steel, constituting the battery armoring stainless steel foil 1, is not limited to a particular type of stainless steel such as austenitic, ferritic, or martensitic stainless steel. Possible examples encompass SUS304, SUS430, and SUS316. Note, however, that austenitic stainless steel is preferable because (i) it has a superior spreading property and a high processability after having been subjected to a solid solution heat treatment and (ii) it exhibits a large degree of work hardening and therefore has a high strength after being shaped.

The battery armoring stainless steel foil 1 has a thickness which falls within the range of, for example, 5 μm to 100 μm. In terms of achieving strength and weight saving which are required of a battery armoring material, the thickness preferably falls within the range of 5 μm to 30 μm. Because the battery armoring stainless steel foil 1 is produced by use of the reduction rolls, the thickness can be controlled by adjusting the spacing of the reduction rolls.

The oxide film 1a is formed on the surface of the battery armoring stainless steel foil 1, instead of the use of a special treatment such as a corona discharge, by the rolled stainless steel foil prepared in the rolling step being annealed in a reducing atmosphere. The oxide film 1a in accordance with Embodiment 1 contains, out of metals contained in the stainless steel, (i) one or more metal elements existing as a hydroxide, in an amount of not less than 35 mol percent and (ii) of Si existing as an oxide (that is, $SiO_2$), in an amount of not more than 40 mol percent. This allows an improvement in adhesiveness between the oxide film 1a and the resin.

A content rate of the one or more metallic elements existing as a hydroxide in the oxide film 1a indicates a value obtained by dividing (i) a sum of contained amounts of respective metallic elements existing as a hydroxide by (ii) a sum of contained amounts of respective metallic elements existing as an oxide or as a hydroxide. Due to the composition of stainless steel, the oxide film 1a contains a large amount of oxides or hydroxides of Fe, Cr, Mn, and Si. As such, it is possible to find a content rate of metallic elements existing as hydroxides by dividing (i) a sum of contained amounts of respective metallic elements existing as a hydroxide by (ii) a sum of contained amounts of Fe, Cr, Mn, and Si existing as an oxide or hydroxide. For example, in a case where Fe and Cr account for substantially all metallic elements existing as a hydroxide, the content rate of metallic elements existing as a hydroxide can be found by dividing (i) a sum of contained amounts of Fe and Cr existing as a hydroxide by (ii) a sum of contained amounts of Fe, Cr, Mn, and Si existing as an oxide or a hydroxide.

A content rate of $SiO_2$ in the oxide film 1a is found by dividing (i) a contained amount of Si existing as an oxide by (ii) a sum of contained amounts of Fe, Cr, Mn, and Si existing as an oxide or a hydroxide.

By setting the content rate of metallic elements existing as a hydroxide in the oxide film 1a so as to be not less than 35 mol percent, hydrogen bonding is caused between (i) a hydroxy group of a hydroxide in the oxide film 1a and (ii) a carboxy group and the like contained in the resin. This allows an improvement in adhesiveness between the oxide film 1a and a resin with which the battery armoring stainless steel foil 1 is coated in a laminated manner. If a content rate of metallic elements existing as a hydroxide which is less than 35 mol percent, then an amount of the hydroxy group comes short. This may cause the adhesiveness to be inadequate between the oxide film 1a and the resin. Note that an upper limit of the content rate of the metallic elements, existing as a hydroxide, is not particularly limited.

Even if hydrogen fluoride is generated, in a battery, in response to a reaction between electrolyte solution and water, the adhesiveness is unlikely to be affected by the hydrogen fluoride. This is because the oxide film 1a contains $SiO_2$ at a low content rate of not more than 40 mol percent.

The oxide film 1a, in which the content rate of metallic elements existing as a hydroxide is not less than 35 mol percent, can be obtained by annealing the rolled stainless steel foil, prepared in the rolling step, at a temperature within the range of 900° C. to 1180° C. in a reducing atmosphere in which (i) a dew point falls within the range of −40° C. to −60° C. and (ii) a hydrogen partial pressure is not less than 75%. Note that an annealing temperature within the range of 900° C. to 1180° C. is higher than that disclosed in Patent Literature 3. Such an annealing temperature, which is in or near a temperature range for soft annealing, allows an improvement in processability of the battery armoring stainless steel foil 1. In a case where ferritic stainless steel is employed, the annealing is preferably carried out at a temperature within the range of 900° C. to 1000° C., which is a temperature range for soft annealing. In a case where austenitic stainless steel is employed, the annealing is preferably carried out at a temperature within the range of 1000° C. to 1100° C., which is a temperature range for solution annealing.

The oxide film 1a has a thickness of not less than 2 nm. In a case where the oxide film 1a has a thickness of less than 2 nm, it is not possible to bring about an effect of adequately improving the adhesiveness between the oxide film 1a and the resin. The oxide film 1a has preferably a thickness of not more than 5 nm. This is because, in a case where the oxide film 1a has a thickness of more than 5 nm, temper coloring may be caused, thereby causing a deterioration in aesthetic properties.

The oxide film 1a has an arithmetic mean roughness Ra (that is, the battery armoring stainless steel foil 1 has an arithmetic mean roughness Ra) (JIS B 0601), in a direction orthogonal to a direction in which the battery armoring stainless steel foil 1 is rolled, which is less than 0.1 μm but not less than 0.02 μm.

In a case where (i) the battery armoring stainless steel foil 1 (that is, the surface of the oxide film 1a) is coated with a resin in a laminated manner, (ii) air is entrained between the resin and the oxide film 1a, and (iii) a secondary battery, employing the battery armoring stainless steel foil 1, rises in temperature during charging, the air between the resin and the surface of the oxide film 1a expands, so that the resin is likely to peel. In order to prevent air from being entrained between the oxide film 1a and the resin, it is therefore necessary to increase a nip linear pressure (that is, a pressure causing the resin to be pressed against the oxide film 1a) which is applied by a lamination roller when the battery armoring stainless steel foil 1 is coated with the resin in a laminated manner. In a case where the nip linear pressure is increased, it then becomes necessary to appropriately adjust an amount of the resin in order to prevent the resin from becoming thinner than a desired thickness. However, by setting the arithmetic mean roughness Ra of the battery armoring stainless steel foil 1 having the oxide film 1a so as to be less than 0.1 μm, it becomes difficult for air to be entrained between the resin and the oxide film 1a, even in a case where the lamination roller applies a low nip linear pressure while the battery armoring stainless steel foil 1 is coated with the resin in a laminated manner. This makes it possible to prevent the resin from peeling due to such air. Furthermore, since there is no need to increase the nip linear pressure, it is easier to achieve a desired resin thickness.

In a case where the battery armoring stainless steel foil 1 has an arithmetic mean roughness Ra of 0.1 μm or greater, it is easy for electrolyte solution to permeate into and collect in fine depressions in the surface of the oxide film 1a which surface is at an interface with the resin. This can potentially cause a decrease in adhesiveness between the resin and the oxide film 1a after immersion in the electrolyte solution. However, by setting the arithmetic mean roughness Ra of the battery armoring stainless steel foil 1 so as to be less than 0.1 µm, it is possible to prevent the adhesiveness between the resin and the oxide film 1a from decreasing after immersion into the electrolyte solution.

The arithmetic mean roughness Ra of the battery armoring stainless steel foil 1 can be adjusted (i) by adjusting a surface roughness of the reduction roll used in the rolling step or (ii) in an abrasion step carried out after rolling. An arithmetic mean roughness Ra of not less than 0.02 µm can be easily achieved by appropriately selecting the surface roughness of the reduction roll employed in the rolling step, without the need for an abrasion step carried out after the rolling step.

Note that, since the thickness of the oxide film 1a is of the order of a few nanometers, the arithmetic mean roughness Ra of the stainless steel foil does not change before and after the annealing step in which the oxide film 1a is formed.

The battery armoring stainless steel foil 1 may be subjected to a conversion treatment. By forming a conversion treatment film on the battery armoring stainless steel foil 1, it is possible to provide a battery armoring stainless steel foil 1 which has even more superior adhesiveness to resin. Note that the type of the conversion treatment film and a method of applying the conversion treatment film are not particularly limited. Possible examples of the conversion treatment film encompass typical types of conversion treatment film such as (i) a chrome conversion treatment film which is obtained by use of a chromate treatment and (ii) a silane coupling agent. Possible examples of the method of applying the conversion treatment film encompass typical methods such as dipping, spraying, roll coating, and bar coating. Note, however, that roll coating and bar coating are preferable in terms of controlling an amount to be applied.

With regard to one side or both sides of the battery armoring stainless steel foil 1, the oxide film 1a is coated with a resin(s) such as a polyolefin resin(s) or a polyester resin(s) in a laminated manner. Such a resin(s) is a resin composition whose main component is, for example, polypropylene or polyethylene terephthalate, which has a high resistance to chemicals. The resin is used, in particular, for a surface that comes into contact with an electrolyte solution. The resin need only contain, as a main component thereof, polypropylene, polyethylene terephthalate, or the like. The resin can be a copolymer which is obtained by copolymerizing with, for example, a modified resin in which a functional group is introduced or which is subjected to acid-modification. A copolymerization composition preferably contains polypropylene, polyethylene terephtalate, or the like in an amount of not less than 50% by mass.

The method by which the battery armoring stainless steel foil 1 is coated with the resin is not particularly limited. Typical examples encompass (i) a thermal lamination method in which the battery armoring stainless steel foil 1, onto which an adhesive has been applied, is coated with a film resin by thermocompression bonding and (ii) an extrusion lamination method in which the battery armoring stainless steel foil 1, onto which an adhesive has been applied, is coated with a melted resin which has just been extruded by an extruder having a T-die.

By pressing the battery armoring stainless steel foil 1 which has been coated with the resin as above, it is possible for the battery armoring stainless steel foil 1 to have a battery container shape. A method of the press working is not particularly limited. Typical examples encompass bulging press work and drawing. The shape of the battery container is not particularly limited and may be, for example, a rectangular tube or a cylinder.

A secondary battery can be produced by the use of the battery armoring stainless steel foil 1 of Embodiment 1 as follows. Specifically, (i) battery elements such as a cathode, an anode, and a separator and (ii) other battery contents such as electrolyte solution are put in the battery container prepared as above, and then heat sealing the battery container. The type of the secondary battery is not particularly limited. Possible examples include a lithium-ion battery, a lithium polymer battery, a nickel hydrogen battery, and a nickel cadmium battery.

The battery armoring stainless steel foil in accordance with Embodiment 1 includes an oxide film, having a thickness of not less than 2 nm, which contains (i) one or more metallic elements existing as a hydroxide, in an amount of not less than 35 mol percent and (ii) $SiO_2$ in an amount of not more than 40 mol percent, the battery armoring stainless steel foil having an arithmetic mean roughness Ra of less than 0.1 µm but not less than 0.02 µm in a direction orthogonal to a direction in which the battery armoring stainless steel foil has been rolled.

The battery armoring stainless steel foil is preferably arranged such that the thickness of oxide film is not more than 5 nm.

The battery armoring stainless steel foil is preferably obtained by annealing a rolled stainless steel foil at a temperature within the range of 900° C. to 1180° C., in a reducing atmosphere in which (i) a dew point falls within the range of −40° C. to −60° C. and (ii) a hydrogen partial pressure is not less than 75%.

The present invention is not limited to the embodiment, but can be altered by a skilled person in the art within the scope of the claims. The present invention also encompasses, in its technical scope, any embodiment derived by combining technical means disclosed in the above descriptions.

EXAMPLES

The following description will discuss non-limiting examples of the battery armoring stainless steel foil in accordance with an embodiment of the present invention.

Examples 1 Through 5, Comparative Examples 1 Through 4

A stainless steel sheet was subjected to cold rolling so as to obtain a stainless steel foil having a thickness of 20 µm. The stainless steel sheet was made of SUS304 containing (i) the components indicated in Table 1, (ii) Fe, and (iii) inevitable impurities.

TABLE 1

| Type of Steel | Components (mass %) | | | | | | |
|---|---|---|---|---|---|---|---|
| | C | Si | Mn | Ni | Cr | P | S |
| SUS304 | 0.071 | 0.57 | 0.80 | 8.09 | 18.1 | 0.03 | 0.004 |

After the rolling step, a stylus-type surface roughness measuring apparatus was used to measure an arithmetic surface roughness Ra of a surface of the stainless steel foil in a direction orthogonal to a direction in which the stainless steel foil was rolled. This measurement showed Ra as being 0.05 μm.

Next, the stainless steel foil, which has been rolled in the rolling step, was subjected to annealing under the plurality of conditions indicated in Table 2 so as to produce respective battery armoring stainless steel foils of Examples 1 through 5 and Comparative Examples 1 through 4. Oxide films on surfaces of the respective battery armoring stainless steel foils were then analyzed with regards to (i) element proportions and (ii) thickness.

Figure 2:
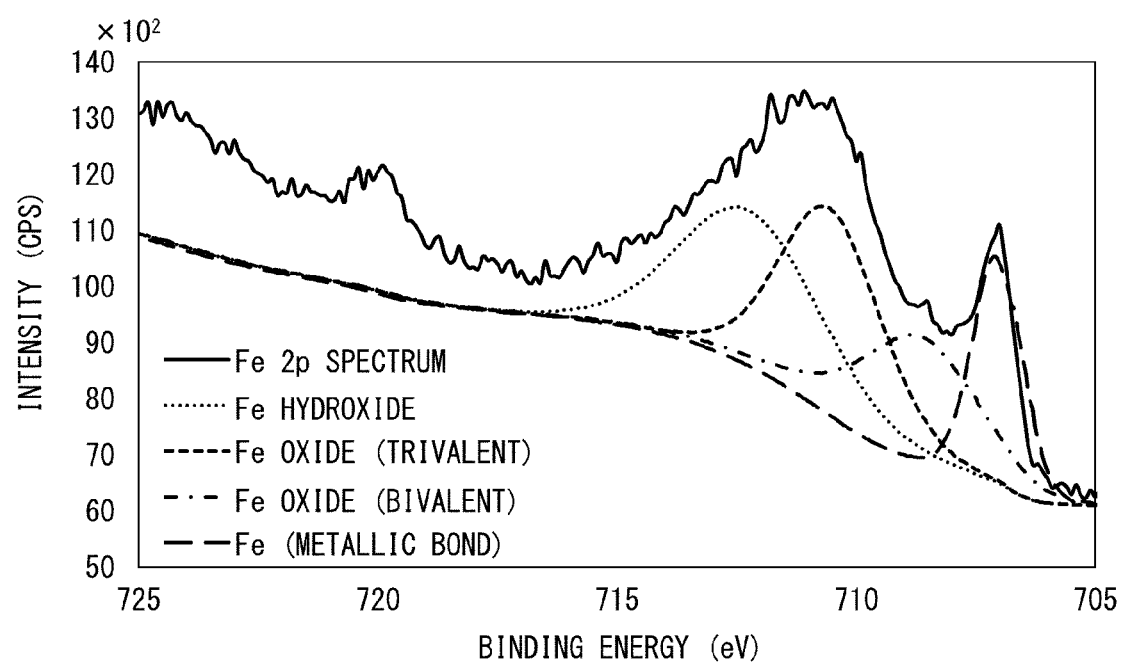
FIG. 2 is an spectrum for Fe obtained by X-ray photoelectron spectroscopy carried out on an oxide film of the battery armoring stainless steel foil.

Each content rate of Fe, Cr, Si, and Mn, which are elements contained in the oxide films, was analyzed by use of an X-ray photoelectron spectroscope ("AXIS NOVA," manufactured by SHIMADZU CORPORATION) having a MgK α X-ray source. For each spectrum of the various elements, peaks corresponding to binding energies of a metallic bond, an oxide, and a hydroxide were isolated, and the integrated intensities of respective peaks were found. FIG. 2 shows an example spectrum of Fe. A content rate (mol percent) of Fe existing as a hydroxide in each oxide film was calculated by dividing (i) a sum of integrated intensities of a peak corresponding to a hydroxide of Fe by (ii) a sum of integrated intensities of peaks corresponding to oxides and hydroxides of Fe, Cr, Si, and Mn. Similarly, a content rate (mol percent) of Fe existing as an oxide in each oxide film was found by dividing (i) a sum of integrated intensities of peaks corresponding to a oxide of Fe by (ii) a sum of integrated intensities of peaks corresponding to oxides and hydroxides of Fe, Cr, Si, and Mn. Content rates of other elements were calculated in a similar manner.

Note that, with regards to Si, there was no peak corresponding to a hydroxide thereof. As such, Table 2 indicates only a content rate of Si existing as an oxide. Note also that Mn existing as an oxide or hydroxide was present only in minute amounts and is therefore omitted from Table 2. In Table 2, "Σ Hydroxides" indicates a sum of content rates of (i) Fe existing as a hydroxide and (ii) Cr existing as a hydroxide. "Σ Oxides" indicates a sum of content rates of (i) Fe existing as an oxide and (ii) Cr existing as an oxide.

Figure 3:
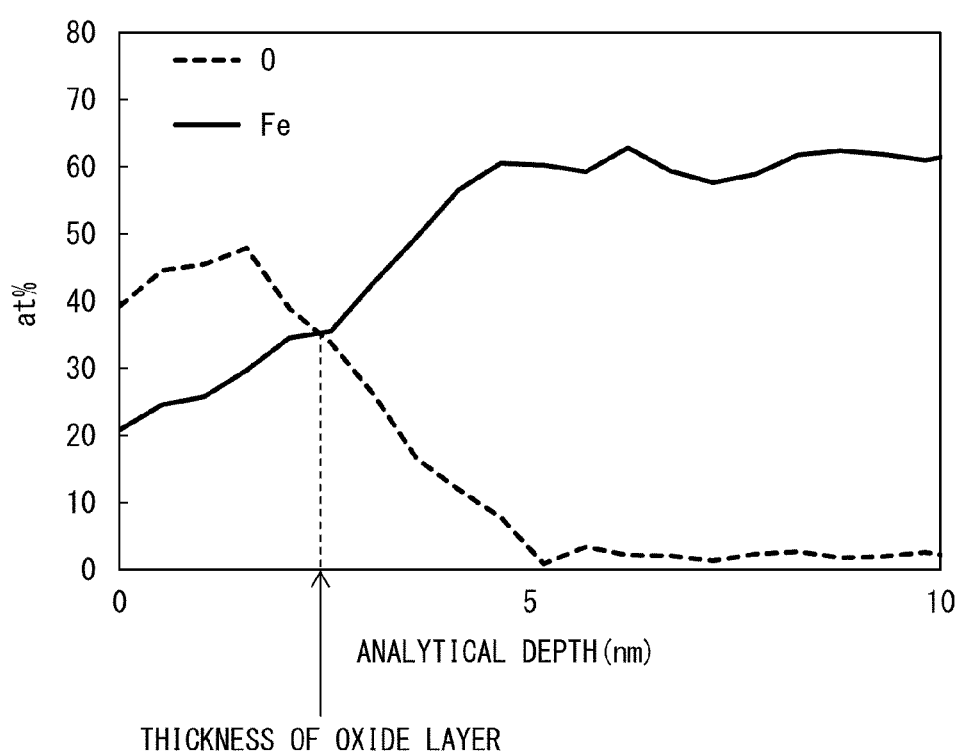
FIG. 3 is a graph showing a relation between (i) an analytical depth measured from a surface of the battery armoring stainless steel foil and (ii) element proportions of Fe and O.

Thickness of each oxide film was measured via the following procedure. An Auger electron spectroscope ("JAMP-9500F," manufactured by JEOL Ltd.) was used to irradiate each oxide film with an electron beam and to measure a kinetic energy intensity of Auger electrons generated by Auger transition of Fe and O in an analytical range of 50 μm$^2$. Quantitative analysis was carried out based on the intensities of each spectrum, and etching was carried out by use of an Ar ion gun. A relation was then analyzed, specifically a relation between (i) an analytical depth obtained by converting a sputtering rate of a reference material of SiO$_2$ into thickness and (ii) element proportions of Fe and O. FIG. 3 is an example of a graph showing a relation between (i) the analytical depth and (ii) the element proportions of Fe and O. An analytical depth at a point where respective curves of Fe and O intersected was considered to be the thickness of the oxide film.

TABLE 2

| | Annealing Conditions | | | Element Proportions (mol %) in Oxide Film | | | | | | | Thickness |
|---|---|---|---|---|---|---|---|---|---|---|---|
| | Temperature | Dew Point | H$_2$ Partial | Fe | | Cr | | Si | Fe + Cr | | of Oxide |
| No. | (° C.) | (° C.) | Pressure (%) | Hydroxide | Oxide | Hydroxide | Oxide | Oxide | Σ Hydroxides | Σ Oxides | Film (nm) |
| Ex. 1 | 1,030 | −50 | 100 | 48 | 18 | 13 | 9 | 4 | 61 | 27 | 3 |
| Ex. 2 | 1,100 | −60 | 90 | 50 | 21 | 13 | 9 | 2 | 63 | 30 | 2 |
| Ex. 3 | 1,130 | −60 | 100 | 53 | 23 | 14 | 8 | 0 | 67 | 31 | 2 |
| Ex. 4 | 1,000 | −40 | 75 | 36 | 22 | 11 | 9 | 19 | 47 | 31 | 3 |
| Ex. 5 | 900 | −40 | 75 | 31 | 15 | 9 | 8 | 34 | 40 | 23 | 4 |
| Com. Ex. 1 | 870 | −35 | 75 | 8 | 11 | 13 | 17 | 43 | 21 | 28 | 7 |
| Com. Ex. 2 | 950 | −50 | 60 | 10 | 16 | 15 | 14 | 41 | 25 | 30 | 4 |
| Com. Ex. 3 | 1,000 | −35 | 100 | 14 | 16 | 12 | 9 | 42 | 26 | 25 | 6 |
| Com. Ex. 4 | 1,200 | −65 | 100 | 42 | 35 | 14 | 8 | 0 | 56 | 43 | 1 |

Note:
In the above table, "Ex." And "Com. Ex." indicate "Example" and "Comparative Example," respectively.

Next, the respective battery armoring stainless steel foils of Examples 1 through 5 and Comparative Examples 1 through 4, having been produced as above, were heated to 100° C. in an oven. Thereafter, one side of each of the battery armoring stainless steel foils was provisionally coated in a laminated manner, at a nip linear pressure of 6.5 N/mm, with an acid-modified polypropylene film ("Admer QE060 #30," manufactured by Tohcello Co., Ltd.) having a thickness of 30 μm. The battery armoring stainless steel foils were then heated for 60 seconds in an oven at 160° C. so as to prepare respective laminated bodies.

An area of 50 mm×50 mm of each of the laminated bodies was subjected to bulging press work, and the processability of the laminated bodies was then evaluated in accordance with the following criteria.

"Very Good": Battery armoring stainless steel foil did not break at a bulging height of 5 mm or more.

"Good": Battery armoring stainless steel foil broke at a bulging height in a range of 3 mm to less than 5 mm.

"Poor": Battery armoring stainless steel foil broke at a bulging height of less than 3 mm.

Each of the laminated bodies was also subjected to a thermal shock test and an electrolyte solution immersion test in order that adhesiveness was evaluated between the acid-modified polypropylene film and the battery armoring stainless steel foil.

In the thermal shock test, the environment of each of the laminated bodies was forced to alternate between a low temperature state and a high temperature state. Such a change in temperature state causes each of the laminated bodies to expand and contract, so that stresses are generated due to differences in expansion rates at the junctions of respective different materials. Peeling caused by this stress was evaluated. Each of the laminated bodies was subjected to a 90° peel test (peel test) before and after a thermal shock test of 300 cycles, where one cycle is defined as one hour at 120° C. followed by one hour at −40° C. Adhesiveness was evaluated as follows between the acid-modified polypropylene film and the battery armoring stainless steel foil.

"Very Good": Peel strength after thermal shock test was not less than 80% of that observed prior to thermal shock test.
"Good": Peel strength after thermal shock test was less than 80% but not less than 40% of that observed prior to thermal shock test.
"Poor": Peel strength after thermal shock test was less than 40% of that observed prior to thermal shock test.

In the electrolyte solution immersion test, each of the laminated bodies was immersed in an electrolyte solution, and adhesiveness between the acid-modified polypropylene film and the battery armoring stainless steel foil was evaluated once the electrolyte solution had been allowed to permeate the acid-modified polypropylene film. For each laminated body, the acid-modified polypropylene film with which the battery armoring stainless steel foil was coated was cut into a grid of 100 squares in conformity with JIS K5400 (previous version of JIS standard). The laminated body was then immersed in the electrolyte solution at 60° C. for 48 hours. The electrolyte solution was obtained by dissolving $LiPF_6$, at a concentration of 1 mol/L, into a mixed solvent containing ethylene carbonate (EC), dimethyl carbonate (DMC) and diethyl carbonate (DEC) at a volumetric ratio of 1:1:1. After the immersion, a tape peeling test was performed, and adhesiveness was evaluated in accordance with the following criteria.

"Very Good": Not more than 20 squares of resin peeled from foil along cutting lines.
"Good": More than 20 squares but fewer than 40 squares of resin separated from foil along cutting lines.
"Poor": More than 40 squares of resin separated from foil along cutting lines.

Table 3 shows the results of the evaluations of processability and adhesiveness.

TABLE 3

| | | Adhesiveness | |
|---|---|---|---|
| No. | Processability | Thermal Shock Test | Electrolyte Solution Immersion Test |
| Ex. 1 | VG | VG | VG |
| Ex. 2 | VG | VG | VG |
| Ex. 3 | VG | VG | VG |
| Ex. 4 | VG | VG | VG |
| Ex. 5 | G | VG | G |
| Com. Ex. 1 | P | G | P |
| Com. Ex. 2 | VG | G | P |
| Com. Ex. 3 | VG | VG | P |
| Com. Ex. 4 | VG | P | P |

Note:
In the above table, "Ex." And "Com. Ex." indicate "Example" and "Comparative Example," respectively.
Furthermore, "VG," "G," and "P" indicate "Very Good," "Good," and "Poor," respectively.

Each of Examples 1 through 5 has an oxide film containing metallic elements (here, Fe and Cr) existing as a hydroxide in an amount of not less than 35 mol percent and $SiO_2$ in an amount of not more than 40 mol percent, the oxide film having a thickness of not less than 2 nm. As shown in Table 3, each of the Examples 1 through 5 was evaluated as "Good" or "Very Good" in terms of both processability and adhesiveness. Example 5, which was annealed at a comparatively lower temperature, had an oxide film in which (i) the content rate of metallic elements existing as a hydroxide was near the lower limit of 35 mol percent and (ii) the content rate of Si was near the upper limit of 40 mol percent. As such, Example 5 was inferior in comparison to Examples 1 through 4 with regards to (i) processability and (ii) adhesiveness after immersion in electrolyte solution.

Comparative Example 1 was annealed at an even lower temperature, which was less than 900° C., and had a content rate of Si which exceeded 40 mol percent. As a result, Comparative Example 1 was evaluated as "Poor" in terms of (i) processability and (ii) adhesiveness after immersion in electrolyte solution. Comparative Examples 2 and 3 were annealed at temperatures greater than 900° C. However, in Comparative Examples 2 and 3, one of the reducing conditions, either dew point or hydrogen partial pressure, was set to be lower in comparison to Examples 1 through 5. As such, the respective oxide films of Comparative Examples 2 and 3 had content rates of Si which exceeded 40 mol percent. This resulted in an evaluation of "Poor" with regards to adhesiveness after immersion in electrolyte solution. Comparative Examples 1 through 3 also had content rates of metallic elements existing as a hydroxide which were less than 35 mol percent. This content rate was particularly low in Comparative Examples 1 and 2, and as a result, Comparative Examples 1 and 2 were inferior to Examples 1 through 5 in terms of adhesiveness after thermal shock testing.

Comparative Example 4 was annealed under reducing conditions whose values were higher in comparison to Examples 1 through 5. As such, the oxide film of Comparative Example 4 had a thickness of only 1 nm, and Comparative Example 4 failed to exhibit adequate adhesiveness.

Examples 6 and 7, Comparative Example 5

Battery armoring stainless steel foils of Example 6, Example 7, and Comparative Example 5 were produced in conditions similar to those of Example 1, except that reduction rolls, having finishing roughnesses different from that of Example 1, were utilized when the stainless steel sheets were cold rolled. Table 4 shows arithmetic surface roughness Ra of the stainless steel foils as observed after the rolling step, the arithmetic surface roughness Ra being in a direction orthogonal to a direction in which the stainless steel foils were rolled. Table 4 also shows thicknesses of the oxide films of the battery armoring stainless steel foils as analyzed after the annealing step. Note that the results of analyzing element proportions in the oxide films were the same as those for Example 1.

Next, the respective battery armoring stainless steel foils of Example 1, Example 6, Example 7, and Comparative Example 5, having been produced as above, were coated in a laminated manner on one side by with an acid-modified polypropylene film. Thereafter, the battery armoring stainless steel foils were evaluated in terms of processability and adhesiveness in the manner described above. Note, however, that the nip linear pressure applied by the lamination roll during coating was set to a low value of 3.5 N/mm. Table 4 shows the results of the evaluations of processability and adhesiveness.

TABLE 4

| No. | Ra (μm) | Thickness of Oxide Film (nm) | Process-ability | Thermal Shock Test | Adhesiveness Electrolyte Solution Immersion Test |
|---|---|---|---|---|---|
| Ex. 6 | 0.02 | 2 | VG | VG | VG |
| Ex. 1 | 0.05 | 3 | VG | VG | VG |
| Ex. 7 | 0.09 | 4 | VG | G | G |
| Com. Ex. 5 | 0.12 | 7 | VG | P | P |

Note:
In the above table, "Ex." And "Com. Ex." indicate "Example" and "Comparative Example," respectively.
Furthermore, "VG," "G," and "P" indicate "Very Good," "Good," and "Poor," respectively.

As shown in Table 4, an increase in the arithmetic surface roughness Ra of a battery armoring stainless steel foil correlates to a decrease in adhesiveness. It was found that an Ra of less than 0.1 μm results in "Good" or "Very Good" adhesiveness. From this fact, it was confirmed that, even in a case where a lamination roller applies a comparatively low nip linear pressure when an oxide film is coated with resin in a laminated manner, a battery armoring stainless steel foil having an arithmetic surface roughness Ra of less than 0.1 μm makes it difficult for air to be entrained between the resin and the oxide film. This makes it possible to prevent the resin from peeling due the air. It was also confirmed that such an arithmetic surface roughness Ra makes it possible to prevent a decrease in adhesiveness, specifically a decrease caused by a phenomenon in which (i) electrolyte solution permeates between the resin and the oxide film in an electrolyte solution immersion test and (ii) thereafter, hydrogen fluoride is generated by a reaction between the electrolyte solution and atmospheric moisture.

In the case of Comparative Example 5, which had an arithmetic surface roughness Ra of not less than 0.1 μm, setting nip linear pressure so as to be a high pressure of 9.0 N/mm when the oxide film was coated with the resin in a laminated manner made it difficult for air to be entrained. This resulted in an evaluation of "Good" in the thermal shock test. The results of the electrolyte solution immersion test, however, were "Poor." This is because there was a decrease in adhesiveness caused by electrolyte solution permeating into the resin and into fine depressions in the surface of the stainless steel foil, which permeation led to hydrogen fluoride being generated by a reaction between the electrolyte solution and atmospheric moisture.

INDUSTRIAL APPLICABILITY

An embodiment of the present invention can be applied to a container for a secondary battery such as a nickel cadmium battery, a nickel hydrogen battery, and a lithium ion secondary battery.

REFERENCE SIGNS LIST

1 Battery armoring stainless steel foil
1a Oxide film

The invention claimed is:

1. A battery armoring stainless steel foil comprising:
a stainless steel foil as a base material,
an oxide film, having a thickness of not less than 2 nm and not more than 5 nm, which contains (i) Fe and Cr, each existing as a hydroxide, in a combined amount of not less than 35 mol percent and (ii) $SiO_2$ in an amount of more than 0 mol percent and not more than 40 mol percent,
the oxide film containing oxides of Fe and Cr,
the oxide film being formed, on a surface of the stainless steel foil, as a single layer in which Fe content is larger than Cr content, and
the battery armoring stainless steel foil having an arithmetic mean roughness Ra of less than 0.1 μm but not less than 0.02 μm in a direction orthogonal to a direction in which the battery armoring stainless steel foil has been rolled.

2. The battery armoring stainless steel foil of claim 1, wherein the battery armoring stainless steel foil has a thickness of not less than 5 μm and not more than 100 μm.

3. The battery armoring stainless steel foil of claim 1, wherein the surface of the stainless steel foil as the base material and a surface of the oxide film has an arithmetic mean roughness Ra of not less than 0.02 μm and less than 0.1 μm in the direction orthogonal to the direction in which the battery armoring stainless steel foil has been rolled.

4. The battery armoring stainless steel foil of claim 1, wherein the oxide film is formed on the surface of the stainless steel foil by annealing the stainless steel foil as the base material.

5. A method of producing a battery armoring stainless steel foil recited in claim 1, the method comprising the steps of:
obtaining a rolled stainless steel foil which has an arithmetic mean roughness Ra of less than 0.1 μm but not less than 0.02 μm in a direction orthogonal to a direction in which the rolled stainless steel foil has been rolled; and
forming an oxide film by annealing the rolled stainless steel foil at a temperature in a range of 900° C. to 1180° C. in a reducing atmosphere in which (i) a dew point falls in the range of −40° C. to −60° C. and (ii) a hydrogen partial pressure is not less than 75%.

* * * * *